United States Patent [19]

Ikeuchi et al.

[11] Patent Number: 4,692,341
[45] Date of Patent: Sep. 8, 1987

[54] METHOD FOR PRODUCING A FOOD PRODUCT SIMULATING SHELLFISH

[75] Inventors: Hiroji Ikeuchi; Kiyoaki Ikeuchi, both of Akashi, Japan

[73] Assignee: Kabushiki Kaisha Ikeuchi Tekkosho, Akashi, Japan

[21] Appl. No.: 818,618

[22] Filed: Jan. 13, 1986

[30] Foreign Application Priority Data

Sep. 24, 1985 [JP] Japan .............................. 60-211805
Dec. 2, 1985 [JP] Japan .............................. 60-271789

[51] Int. Cl.⁴ ...................... A23L 1/27; A23L 1/325; A23P 1/00
[52] U.S. Cl. ................................. 426/250; 426/305; 426/513; 426/643
[58] Field of Search ............... 426/250, 513, 643, 305, 426/412

[56] References Cited

U.S. PATENT DOCUMENTS 4,303,008 12/1981 Hice et al. ........................... 426/513
4,497,844 2/1985 Hice et al. ........................... 426/513
4,503,081 3/1985 Ikoma et al. ........................ 426/643

Primary Examiner—George Yeung
Attorney, Agent, or Firm—Marshall, O'Toole, Gerstein, Murray & Bicknell

[57] ABSTRACT

This disclosure relates to apparatus and method for the production of fish-paste food products having the appearance of shelled shrimp, crab claws, lobster, abalone, etc. The apparatus comprises a two-piece mold with a mold cavity conforming to the shape of the product, means for spraying a coloring agent into the cavity, filling means for pressing a paste of ground fish meat into the mold cavity, a heating unit for heating and solidifying the fish paste, and means for removing the heated and solidified fish-paste food products from the mold. The invention further comprises the method of providing a split mold having a cavity generally conforming to the shape of a shellfish, spraying the inside wall of the cavity with an aqueous food coloring, filling the cavity with a meat paste under pressure, heating the mold and the paste to a sufficient temperature to cook and color the meat paste, and removing the product from the mold.

1 Claim, 5 Drawing Figures

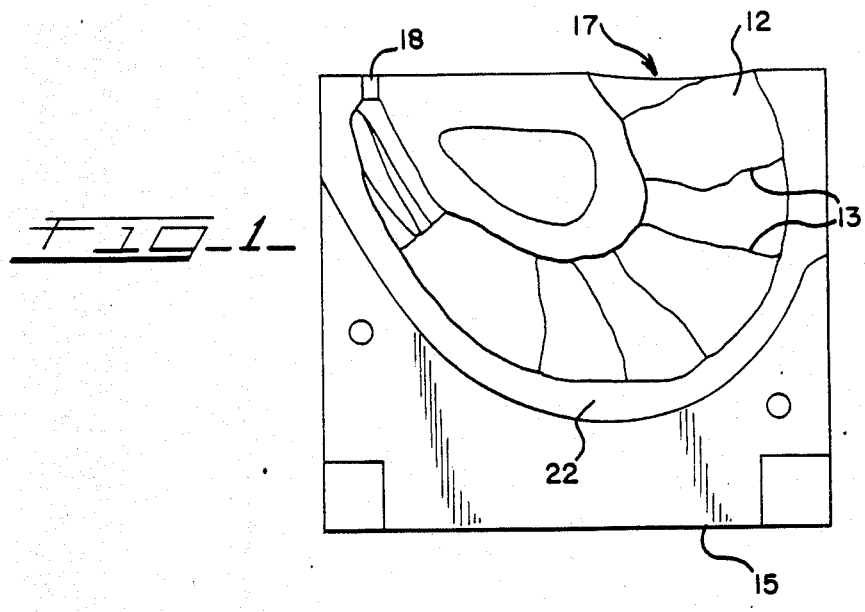
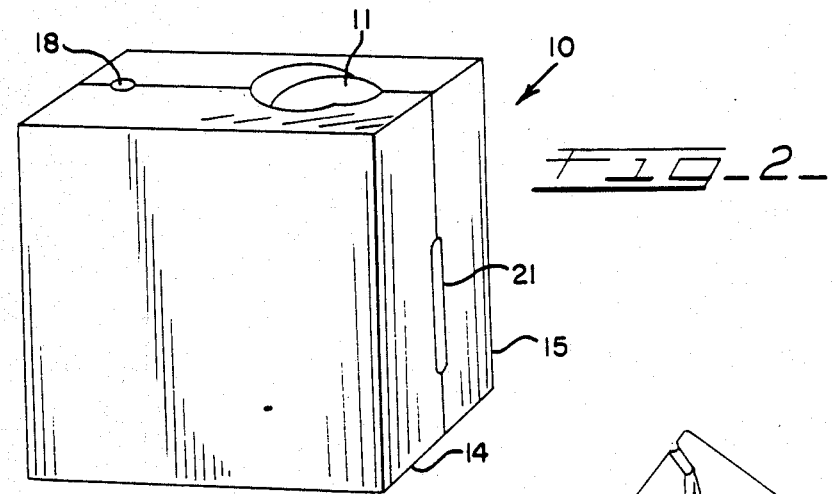
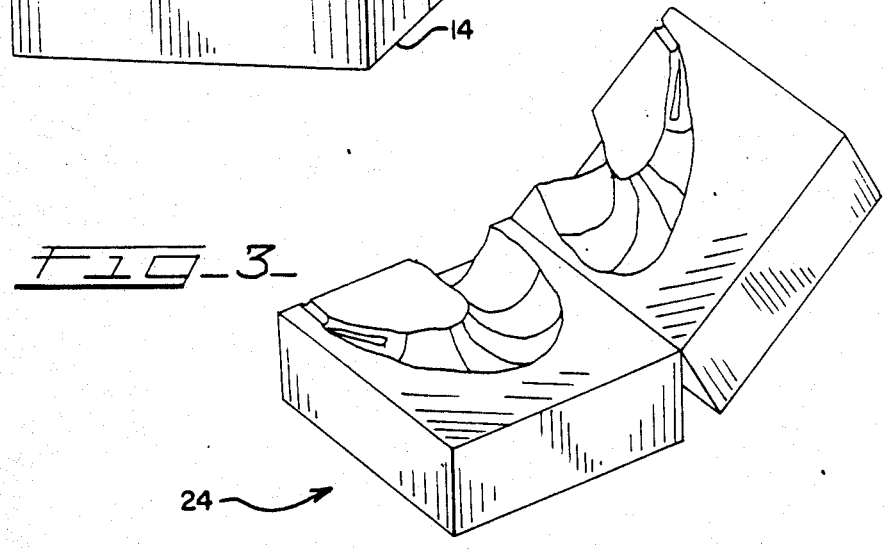

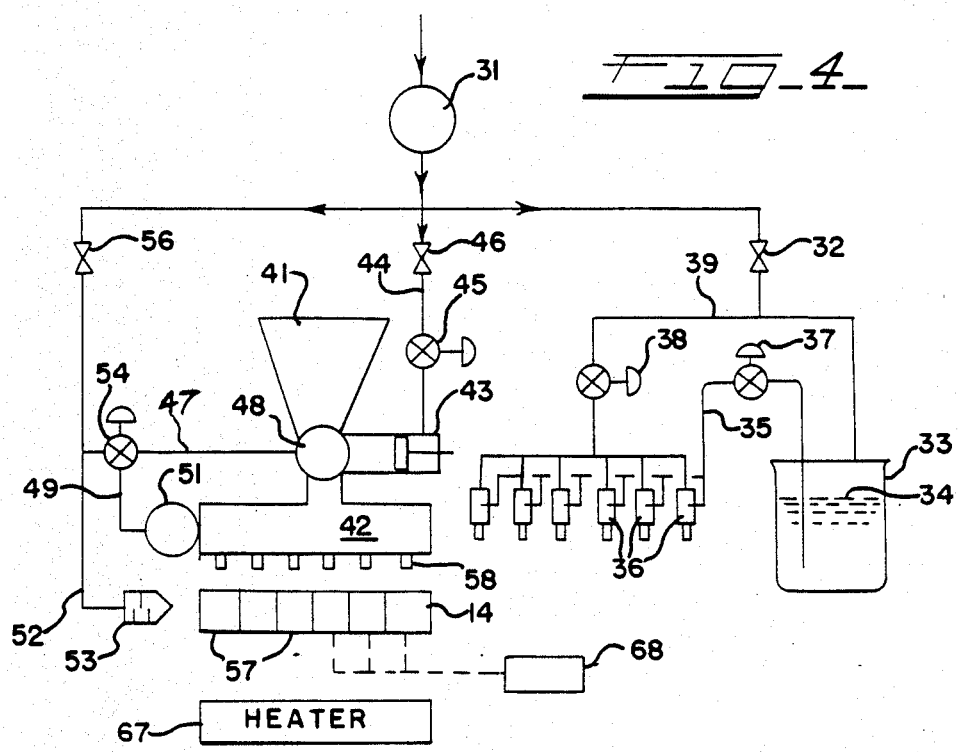
FIG_4_
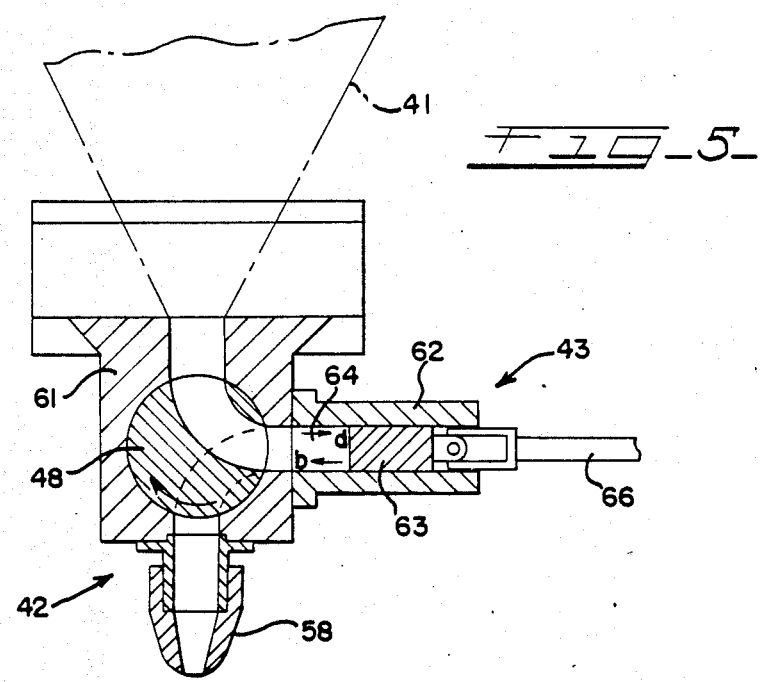
FIG_5_

METHOD FOR PRODUCING A FOOD PRODUCT SIMULATING SHELLFISH

FIELD AND BACKGROUND OF THE INVENTION

The present invention relates to a method and apparatus for producing a food product shaped like a shellfish, and for applying a coloring simulating the natural color of the product.

It is known in the prior art to make a simulated shellfish, such as shrimp, crab claws, lobster and abalone, from a fish paste. For example, a paste of ground fish meat has been formed into a flat sheet, cut into thin bar-like shapes gathered together and cooked, and colored to form bars having the appearance of crab legs. This type of technology is described in Japanese patent provisional publication No. 60-180564 laid open Sept. 14, 1985 and in our copending U.S. patent application Ser. No. 769,175 filed Aug. 26, 1985.

To color the surface of such a bar-shaped food product with a red food coloring to reproduce the natural color of the real crab, it has been common practise to wrap the bar-shaped paste in a polyethylene film, the inner side of the film having been coated with a red food coloring, and then boil or steam the product so as to cook and transfer the coloring to the paste.

Although it has been sufficient to simply shape the fish paste into bars or cylinders and cut it into appropriate lengths, up until this invention there has been no method and apparatus for processing ground fish meat in order to produce fish-paste products having the true appearance of the shelled meat of shrimp, crab claws, lobster, and other shellfish.

While the prior art color transfer technique described above is useful in the coloring of bar-shaped products, it cannot be successfully applied to foods having intricate shapes such as simulated shrimps which have joints, for the food coloring cannot be evenly transferred, by the prior art method, to such irregular surfaces to faithfully reproduce the appearance of shrimp and the like.

It is a general object of the present invention to provide a method and apparatus for forming and coloring a simulated shellfish food product such as a shrimp, a claw of a crab, or the like.

BRIEF SUMMARY OF THE INVENTION

This invention includes apparatus and method for the production of fish-paste food products having the appearance of shelled shrimp, crab claws, lobster, abalone, etc. The apparatus comprises a two-piece mold with a mold cavity conforming to the shape of the product, means for spraying a coloring agent into the cavity, filling means for pressing a paste of ground fish meat into the mold cavity, a heating unit for heating and solidifying the fish paste, and means for removing the heated and solidified fish-paste food products from the mold.

The invention further comprises the method of providing a split mold having a cavity generally conforming to the shape of a shellfish, spraying the inside wall of the cavity with an aqueous food coloring, filling the cavity with a meat paste under pressure, heating the mold and the paste to a sufficient temperature to cook and color the meat paste, and removing the product from the mold.

BRIEF DESCRIPTION OF THE DRAWINGS

The invention will be better understood from the following detailed description taken in conjunction with the accompanying figures of the drawings, wherein:

FIG. 1 is a view of a half of a mold for use in practising the invention;

FIG. 2 is a perspective view of a half of a mold as shown in FIG. 1;

FIG. 3 is a perspective view showing the mold in the open position;

FIG. 4 is a schematic diagram of apparatus for practising the invention; and

FIG. 5 is an enlarged view in section showing a part of the apparatus of FIG. 4.

DETAILED DESCRIPTION OF THE DRAWINGS

The body of a crustacean animal, or shellfish, such as a shrimp, crab, prawn or lobster, has an articulation or joint system for contracting and extending its body segments, and its carcass also shows a plurality of joints. In a metal mold 10 having a mold cavity 11 conforming to the shape of such a carcass, the joints separating the segments of the body and the flat segments are reversedly reproduced in the inside wall of the mold cavity. FIGS. 1-3 show a mold for producing a shrimp-shaped food product, and the cavity wall includes flat portions 12, with the joints being formed as crosswise projecting striations 13 (hereinafter referred to as projections). The mold 10 is split to form two halves 14 and 15, and the inside wall of the split metal mold is preferably Teflon coated so that the finished food product may be easily released and removed from the mold. The two ends of the cavity 11 appear at the surface of the mold and form two filling openings 17 and 18 which are preferably on the top side of the mold.

The mold halves 14 and 15 which constitute the split mold are closed and the crustacean meat paste is fed into the cavity 11 through the larger opening 17. Prior to this filling operation, the inside wall of the mold cavity 11 is sprayed with an aqueous solution or dispersion of food coloring. The coloring is added when the mold halves are closed and the spray enters the larger opening 17. The coloring so applied is deposited on the inside wall, but since the projections 13 of the inside wall act as barriers to the inflow of the coloring spray, there is formed a pool of the coloring in the portion of the segment 12 on the upstream side of the projection, while the portion of the segment 12 behind each projection 13 is substantially clear of the coloring. The resulting uneven coloration of the mold cavity wall due to the projections 13 gives an appearance closely resembling that of the actual crustacean. The meat paste is then fed into the mold cavity 11 under pressure and the mold is heated to cook and solidify the product. Finally, the metal mold is opened to remove the finished food product.

In the case of a mold for the manufacture of a paste food product simulating a shrimp, the cross section of the mold cavity is diminished towards the tail portion which connects to the smaller opening 18, so that the meat paste fed into the cavity through the opening 17 is subjected to a progressively increasing velocity of feed. The result is that a relatively large proportion of the coloring previously deposited on flat portions 12 of the cavity wall is carried away by the meat paste flowing toward the tail portion. Consequently, the meat paste filling the tail portion of the cavity is colored with the deepest shade while the surface of the meat paste ultimately filling the flat portions 12 is stained only faintly red because much of the coloring has been substantially depleted. Moreover, the zones of the flat portions 12 behind the projections 13 are little stained because, after packing the meat paste up to the tail portion, the former zones are filled with the meat paste along the inner wall under the internal pressure of the mold, with the result that the contrast of the color densities at the joints of the shrimp are faithfully reproduced.

Since the inner wall of the metal mold is Teflon-coated as previously mentioned, the food product can be neatly removed from the mold. The food product thus formed and colored has a sufficient density of color contrast where it is needed and gives a sensory quality approaching that of real crustacean meat.

With reference to FIGS. 1 and 2, the two mold halves 14 and 15 are pivotably connected together by a hinge 21. The reference numeral 22 in FIG. 1 indicates a Teflon lining in the mold halves. Suitable pins and holes may be provided to properly align the mold halves when they are closed.

The small opening 18 forms a vent hole which releases the trapped air from the cavity into the atmosphere as the meat paste fills the cavity. The food coloring is an aqueous solution o dispersion of food color which is sprayed in mist form into the mold cavity through the large opening 17 by means of a spray nozzle (not shown in FIGS. 1 and 2).

Thus, in accordance with the present invention, one is able to manufacture a food product having a sensory quality resembling that of real crustacean meat, from a raw material composed of meat paste, a binding agent and so on. It should be understood that the above-described production technique can be equally well applied to the manufacture of other paste foods simulating the claw of a crab, the carcass of a lobster, and so on.

FIG. 3 shows a mold 24 similar to the mold 10 but without a Teflon lining for the mold cavity. The entire mold may be made of a non-stick material such as Teflon or only a thin coating in the cavity may be provided. In addition an oil-based release agent may be sprayed on the inside of the mold prior to filling it with a meat paste.

FIGS. 4 and 5 show automated machinery for making food products in accordance with the above described process and using the described molds. The specific example shown in FIG. 4 utilizes air pressure for operating the various parts of the machine.

The compressed air used to drive the machine is supplied by an air compressor 31 at a pressure of approximately 7 kg/cm$^2$. One branch of the pressurized air line is connected through a shut-off valve 32 to the interior of a closed coloring agent tank 33 and applies pressure to the liquid coloring agent 34 inside the tank. A liquid line 35 carries the coloring agent from the tank 33 to each of a plurality of spraying nozzles 36 and a control valve 37 in this liquid line 35 operates in conjunction with a control valve 38 in an air line 39 also connected to the spraying nozzles 36. The air line 39 is connected so that the air is guided to the spraying nozzles via the control valve 38 and the coloring agent is sprayed from the nozzles 36.

In addition, a hopper 41 is filled with the raw paste of ground fish meat, which is fed to a filling unit 42 by an extruder 43. An air line 44 is connected to the extruder 43 via a control valve 45 and a shut-off valve 46. In addition, an air line 47 is connected to a switch valve 48 (better shown in FIG. 5) on the hopper, an air line 49 is connected to the filling unit's control apparatus 51, and an air line 52 is connected to a cleaner 53 which cleans the molds. A control valve 54 is connected to the lines 47 and 49 and a shut-off valve 56 is connected to the lines 47, 49 and 52. Multiple molds 57 are arranged in a row so that the large filling openings in the molds are positioned directly beneath a plurality of filling nozzles 58 of the filling unit 42. The positional relationship of the filling unit 42 and the metal molds 57 changes as the operation progresses.

Each of the molds 57 has the construction of the molds 10 or 24 and has a cavity in, for example, the shape of a shelled shrimp as shown. Each mold 57 may contain a single cavity or it may contain several cavities. The filling unit 42 includes a publicly known fixed-amount filling apparatus (in other words, as shown in the Collection of commonly known popular technology (page 21) published by the Japanese Patent Office on Feb. 20, 1980.

This filling unit is shown in more detail in FIG. 5. A casing 61 part of the filling unit has the hopper 41 attached to the top of it, and inside the casing 61 there is the switching valve 48 which connects the piston case 62 of the extruder 43 located at the side of the casing 61 with the hopper 41 and with each of the discharge nozzles 58 as appropriate. The valve 48 has two positions of a rotary valve member, one where the member connects the hopper with the piston chamber 64 and another where it connects the chamber 64 with a nozzle 58. The member is rotated between its two positions in synchronism with the movement of the pump piston 63, by the air pressure in the lines 44 and 47 under the control of the valves 45 and 54. When the piston 63 moves in the direction indicated by arrow d (toward the right) the switching valve 48 connects the hopper 41 with the piston chamber 64, thus filling the piston chamber with a fixed amount of the fish paste. Next, the switching valve 48 switches to connect the piston chamber with a nozzle 58 and the piston 63 moves in the direction indicated by arrow b (toward the left), thus causing the fixed amount of the fish paste to be forced out through the nozzle 58.

The piston 63 is connected to a rod 66 of a conventional pneumatic cylinder (not shown) which moves the piston 63 back and forth as described. In the specific example shown in the drawing, six molds 57 are movably mounted underneath the filler 42 which includes an equal number of nozzles 58. The control 51 operates the filling unit 42 to vertically move the unit 42 relative to the molds 57. One valve 48 is provided for each nozzle 58. The filler 42 operates to feed doses of the fish meat simultaneously for all of the nozzles 58. The spraying nozzles 36 are also equal in number to the molds, and the spacing of the molds is equal to the spacing between adjacent meat nozzles 58 and adjacent color spraying nozzles 36.

In the first step of the production process, the ground fish meat, starch which is used as a caking agent or binder, and small pieces of fish-paste food product which make the product more appetizing, are blended together inside the hopper 41. A release agent (an oil-based release agent which is commonly used in food production) is preferably applied to the inside walls of the mold cavities, the two halves of each mold are fastened together, the molds are positioned under the nozzles 36, and then the food coloring agent 34 is sprayed onto the mold cavities. The color of the coloring agent is selected according to the product being produced.

Next, the molds are moved under the nozzles 58 and the filling unit 42 is operated, causing the raw fish paste to be forced through the nozzles 58 and into the molds. Thus the fish paste is formed into the shape of the shelled meat of a selected shellfish. The filled molds 57 are then heated by steam or gas roasting to approximately 80° to 90° C. for about 1 to 1.5 minutes by a conventional heating apparatus 67 thus heating and solidifying the fish paste inside the molds; the molds are then cooled and the products can be removed at a temperature of approximately 60° C. Next, the two-piece molds 57 are opened and turned upside down by a mechanism 68 connected to the molds, causing the food products to fall into a suitable receptacle; any products which have adhered to the inside walls of the molds and do not immediately fall out may be scraped out by using a rotating roller brush of the mechanism 68 (not shown in the drawings).

The metal molds 57 are then cleaned by the cleaner 53 which directs a cleaning solution on the molds and by using a brush and hot water spray, and the entire process is repeated over and over again. A closed-loop conveyor may be provided whereby the raw materials are supplied from one end while completed products are automatically removed on the other end.

It will be apparent from the foregoing that novel apparatus and process have been provided for the production of fish-paste food products with the appearance of the shelled meat of such shellfish as shrimp, crab claws, lobster, abalone, etc. The apparatus comprises two-piece metal molds with inside cavities conforming to the shelled meat. The apparatus may further comprise at least one nozzle which sprays a coloring agent into the inside of the metal molds, a filling unit which presses a paste of ground fish meat into the metal molds, a heating unit which heats and solidifies the fish paste, and means for removal of the heated and solidified shellfish-like fish-paste food products from the molds. Thus ground fish meat can be processed into a high-grade seafood product with the special appearance of the shelled meat of a shellfish. Using this invention, food products which closely resemble expensive shellfish meat in shape, color, texture, and taste can be produced inexpensively and rapidly, and perfectly uniform food products can be supplied to the consumer, thus making this invention extremely useful and effective.

What is claimed is:

1. A process for producing a food product simulating shellfish using a split mold having a mold cavity therein which generally conforms to the shape of a shellfish to be simulated, said mold cavity having a cavity wall including flat portions and crosswise projecting striations, said striations having upstream sides and behind sides, comprising the steps of closing said mold, spraying said cavity wall with an aqueous food coloring and forming pools of the food coloring on said flat segments on said upstream sides and leaving said behind sides substantially clear of said coloring, filling the cavity with a meat paste under pressure, heating the mold to a sufficient temperature to solidify and color the meat paste, and removing the meat paste from the cavity by opening the split mold.

* * * * *